United States Patent [19]

White

[11] Patent Number: 5,174,703

[45] Date of Patent: Dec. 29, 1992

[54] TWO-PART ADJUSTABLE CONNECTOR ASSEMBLY

[76] Inventor: Timothy T. White, P.O. Box 5000, Davis, Calif. 95617

[21] Appl. No.: 618,654

[22] Filed: Nov. 27, 1990

[51] Int. Cl.[5] ................ F16B 37/12; F16B 39/00
[52] U.S. Cl. ............................. 411/107; 411/60; 411/109; 411/970; 411/999
[58] Field of Search ............... 411/45, 48, 55, 60, 411/61, 107, 108, 337, 383, 384, 389, 533, 970, 999; 52/217; 49/504, 505

[56] References Cited

U.S. PATENT DOCUMENTS

| | | |
|---|---|---|
| 381,329 | 4/1888 | Cahill . |
| 1,275,944 | 8/1918 | Lacerda . |
| 1,285,245 | 11/1918 | Lacerda et al. . |
| 1,750,921 | 3/1930 | Bright . |
| 2,075,714 | 3/1937 | Hamill . |
| 2,390,173 | 12/1945 | Richey . |
| 2,481,721 | 9/1949 | Carper . |
| 2,639,179 | 5/1953 | Phelps . |
| 2,730,773 | 1/1956 | Rogue . |
| 2,831,520 | 4/1958 | Clarke . |
| 3,230,994 | 1/1966 | Rosan . |
| 3,502,130 | 3/1970 | Gulistan . |
| 3,518,794 | 7/1970 | Horner . |
| 3,553,891 | 1/1971 | Casebolt et al. . |
| 3,561,075 | 2/1971 | Selinko ........................... 411/999 |
| 3,667,338 | 6/1972 | Johansson . |
| 3,668,966 | 6/1972 | Kincaid . |
| 3,685,226 | 8/1972 | Richter . |
| 3,859,764 | 1/1975 | Cary . |
| 3,906,671 | 9/1975 | Maldonado . |
| 4,017,267 | 4/1977 | Hawley . |
| 4,453,346 | 6/1984 | Powell et al. . |
| 4,486,134 | 12/1984 | White . |
| 4,921,382 | 5/1990 | Fries et al. ...................... 411/107 |
| 4,930,959 | 6/1990 | Jagelid ............................ 411/383 |

FOREIGN PATENT DOCUMENTS 262504 7/1949 Switzerland .

OTHER PUBLICATIONS

Essve Inc.—Programa Frame Screw.

*Primary Examiner*—Neill R. Wilson
*Attorney, Agent, or Firm*—John J. Leavitt

[57] ABSTRACT

A two-part adjustable connector assembly for utilization in adjustably connecting two juxtaposed members which, for proper fit, must be secured to one another and must be capable of being moved relative to each other to accomplish a proper fit. An example of such a situation is provided by a door frame which must be attached to supporting structural members and which must be plumb even though the supporting structural members to which the door frame is secured are not plumb. In one aspect, the adjustable connector assembly includes a first connector adapted to be embedded in one of the members, say the door frame, and to be secured to the other juxtaposed structural member by a second connector rotatably mounted on the door frame in axial alignment with and adjustably engaging the first connector to preclude unintended axial displacement thereof.

8 Claims, 3 Drawing Sheets

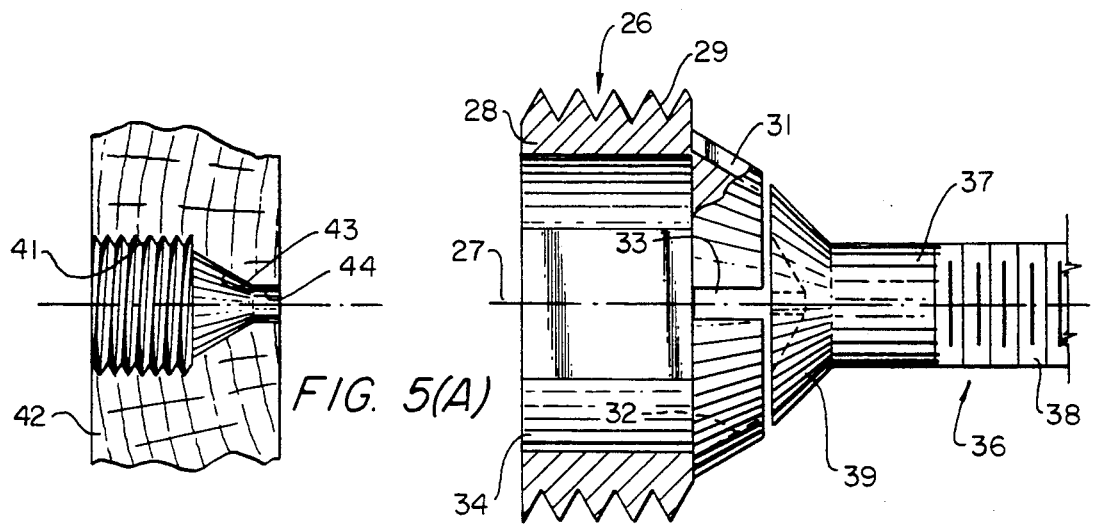
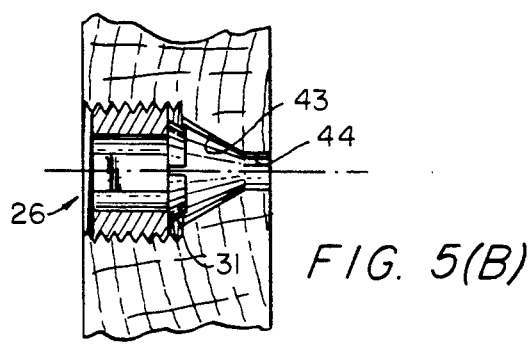
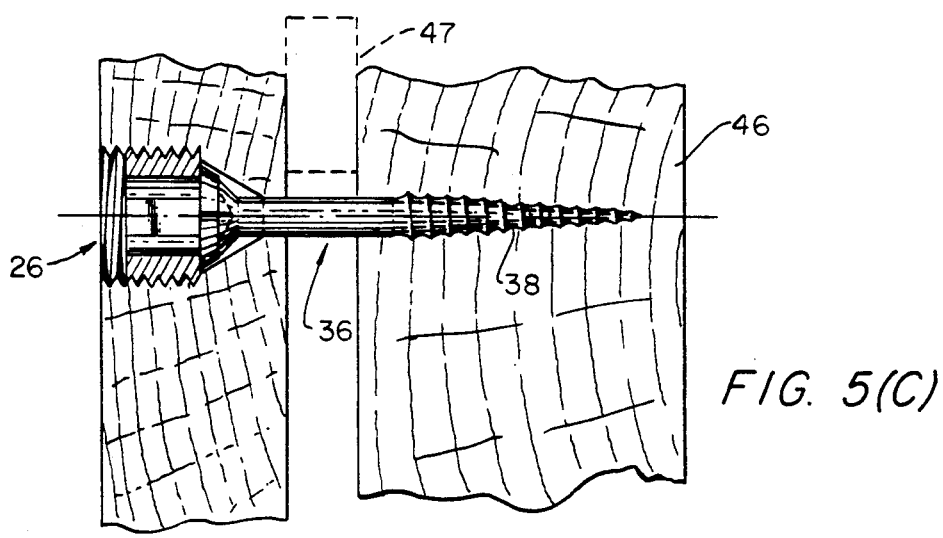

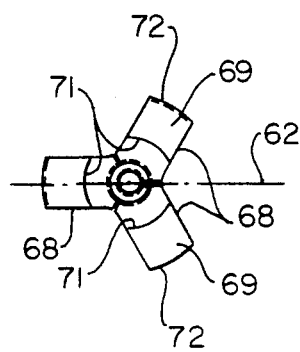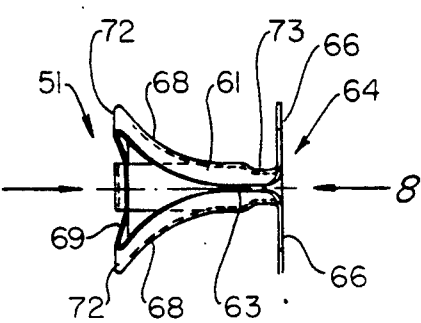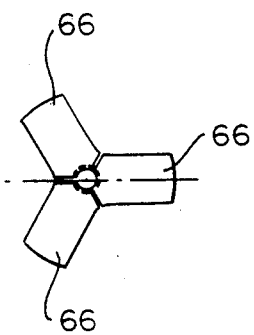
FIG. 6          FIG. 7          FIG. 8
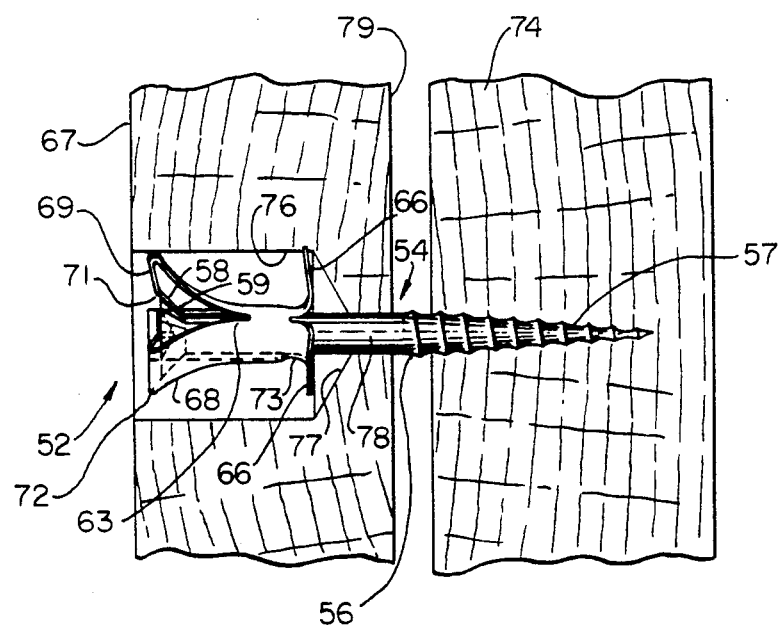
FIG. 9

TWO-PART ADJUSTABLE CONNECTOR ASSEMBLY

BACKGROUND OF THE INVENTION

1. Field of the Invention

This invention relates to connectors and particularly to adjustable connectors adapted to rigidly secure together two juxtaposed structural members while permitting selective adjustment of one member in relation to the other.

2. Description of the Prior Art

It is believed that the prior art related to this invention may be found in Class 49, sub-classes 504 and 505 and in Class 52, sub-class 217. A search through the classes and sub-classes noted has revealed the existence of the following U.S. Pat. Nos.:

| | | |
|---|---|---|
| 2,481,721 | 3,685,226 | 2,730,773 |
| 3,906,671 | 3,518,794 | 4,453,343 |

Other patents known to exist include the following U.S. Pat. Nos.: 381,329; 1,750,714; 3,553,891; 3,668,966 and 3,859,764, and the patents cited in the inventor's U.S. Pat. No. 4,486,134.

It frequently happens that when two juxtaposed members are fastened together to achieve a desired fit, one or the other of the members does not fit properly and must be adjusted in relation to the associated member in order to achieve a proper fit. Such a condition exists in the installation of door frames in wall openings, where the door frame must be secured between appropriate wall studs which may or may not be plumb. In this particular situation, it has been the industry custom to insert shims in the form of tapered roof shingle portions in the space between the door frame and the associated wall stud, driving the tapered shingle portions in until plumb is achieved. Finishing nails are then driven through the door frame and shingles to anchor the shingle shims and door frame in position, the hope being that they do not shift position and cause the door frame to lose its plumb or to warp out of its proper position.

In industry in general, there are many instances in which two juxtaposed structural members must be adjusted in relation to each other to achieve a desired fit. It is the object of this invention to provide a two-part adjustable connector assembly adapted to interconnect two such structural members to retain them in juxtaposed position, while being adjustable to position the two members as desired.

Particularly with respect to the building industry, and the installation of door frames in wall openings, it is necessary that a door frame be plumb even though the supporting wall members are not plumb. Accordingly, another object of the present invention is the provision of a two-part adjustable connector assembly adapted to be installed so as to rigidly interconnect a door frame with the fixed-in-position wall studs while permitting adjustability of the door frame member in relation to the supporting studs to achieve a desired plumb position of the door frame in relation to the supporting stud members.

Still another object of the invention is the provision of an article of manufacture in the form of a tubular cylindrical, threaded, slotted connector member that may easily be applied to a conventional wood or metal screw to form one part of a two-part adjustable connector assembly for application in the manner previously discussed.

A still further object of the invention is the provision of an article of manufacture that may be applied to the door frame by the manufacturer thereof, with the remaining part, namely, a wood or other screw, being applied in the field at the time of installation.

The invention possesses other objects and features of advantage, some of which, with the foregoing, will be apparent from the following description and the drawings. It is to be understood however that the invention is not limited to the embodiments illustrated and described, since it may be embodied in various forms within the scope of the appended claims.

SUMMARY OF THE INVENTION

In terms of broad inclusion, the adjustable connector assembly of the invention, in one aspect, includes a sleeve-like tubular first connector member threaded over a portion of its exterior periphery and provided with means by which the tubular connector member may be engaged by an appropriate tool to effect rotation of the tubular connector member, and a second connector member adapted to be applied through the tubular member. In another aspect, the tubular connector is journaled on a shank or journal portion of a second connector having a head, the first and second connector members being rotatably related one to the other and initially free for axial displacement with respect to each other. The head of the second connector is tapered while one end of the tubular connector is provided with a series of circumferentially spaced tapered arcuate segments against which the head of the second connector impinges to flex the segments outwardly and permit passage of the head of the second connector, which then abuts the associated tapered end of the first connector. In a third aspect of the invention, the first and second connector members are freely rotatable in relation to each other, while being locked against relative axial displacement after installation. Rotation of the second connector member in relation to the first will effect relative movement between the juxtaposed structural members. In still another aspect of the invention, the first connector member is provided with a central body portion through which a second member may be self-tapped. Prongs forming a part of the first connector are displaced outwardly by the passing of the second connector member therethrough, thus effectively locking the first connector member in its proper place so that adjustment of the position of the door frame or other object may be effected.

BRIEF DESCRIPTION OF THE DRAWINGS

FIG. 5 is an enlarged cross-sectional view of a second embodiment of a first connector member adapted to be installed at the factory where the door frames are assembled, shown in relation to a second connector member adapted to be installed in the field.

FIG. 5(A) is a fragmentary cross-sectional view illustrating the preferred configuration of the bore or socket formed in a frame member to receive the first connector member illustrated in FIG. 5.

FIG. 5(B) is a fragmentary cross-sectional view similar to FIG. 5(A) but showing the first connector member installed in the frame.

FIG. 5(C) is a fragmentary cross-sectional view illustrating the complete connector assembly comprising first and second connector members installed in adjusted position.

FIG. 6 is a side elevational view of a third embodiment of a connector member, adapted to be installed at the factory where the pre-packaged door and window frames are assembled.

FIG. 7 is an end elevational view of the connector member of FIG. 6, taken in the direction of the arrow 7.

FIG. 8 is an end elevational view of the connector member of FIG. 6, taken in the direction of the arrow 8.

FIG. 9 is a fragmentary vertical cross-sectional view through a frame member and supporting stud illustrating the connector member of FIG. 6 in a completed assembly including an adjustment screw.

DESCRIPTION OF THE PREFERRED EMBODIMENTS

The construction industry has become so specialized that many aspects of the construction of a building are now prefabricated or pre-assembled in a factory and shipped to the site of construction for installation in a supporting framework which itself might have been pre-assembled or pre-fabricated in a factory. Thus, it is not uncommon for entire wall sections, including thermal insulation, exterior sheathing, and electrical cables or conduits or harnesses to be pre-assembled and hauled by truck to the erection site, where hoisting equipment is used to place the wall sections in position on concrete slabs or foundations, to be joined to other similarly fabricated wall sections. Such pre-fabrication extends to the millwork required on a project, such as the windows and doors, both exterior and interior. These are frequently assembled in the factory as complete units that need merely to be hauled to the job site and fastened in a wall opening designed to receive it.

It appears however, that the technology of devices to quickly and efficiently fasten these pre-assembled components together in the field has not progressed as rapidly as the technology for assembly of the components in the factory. It is to alleviate this dearth of fastening devices for pre-fabricated structural units that I have designed the connectors and connector assemblies forming the subject matter of my invention.

When wall units or sections are assembled, either in the factory or in the field, rough-framed openings are formed in the wall sections to receive windows and doors. It frequently happens that the structural members that frame the rough openings are not plumb, i.e., not perfectly vertical in space, thus requiring that the door or window to be "hung" in the opening be adjusted so that its vertical side members are plumb and its horizontal top or header member is truly horizontal in space despite the deficiency of this quality in the support members to which they are attached. It should be understood that the connectors and connector assemblies described and illustrated herein, with minor modifications, may be utilized in other applications besides the windows and doors with which they are illustrated and described for purposes of convenience, and this will become obvious to those skilled in the art from the description that follows.

Figure 1:
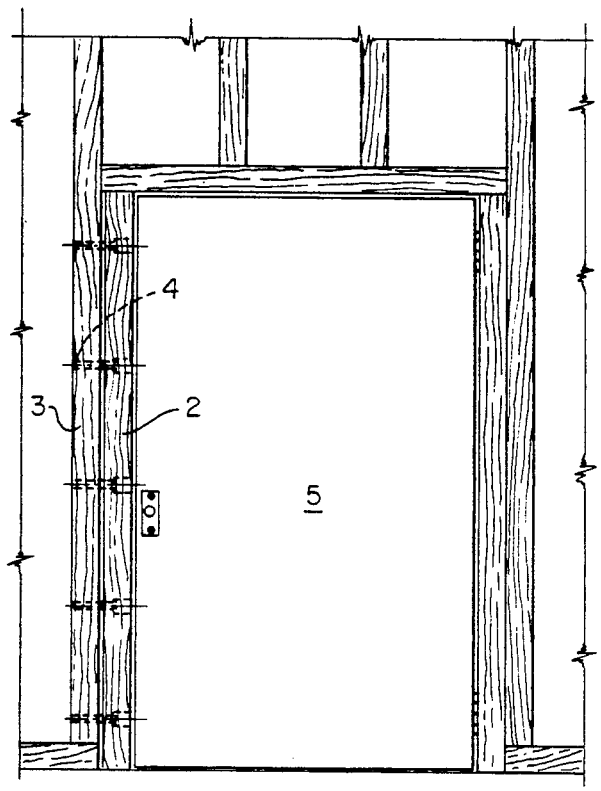
FIG. 1 is a fragmentary elevational view illustrating the adjustable connector assembly of the invention used in association with a door frame mounted in a wall opening.
Figure 3:
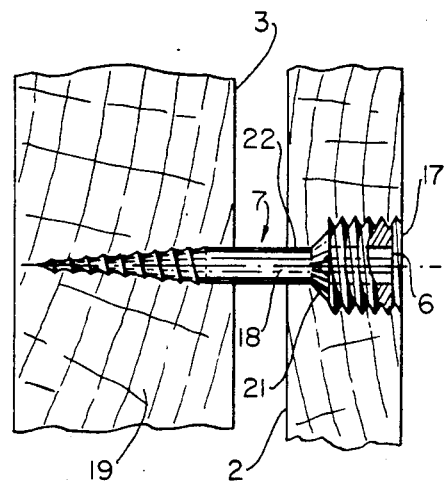
FIG. 3 is a fragmentary cross-sectional view of the adjustable connector assembly illustrated in FIG. 2 shown mounted in a frame member and supporting stud, the latter shown in cross-section.
Figure 2:
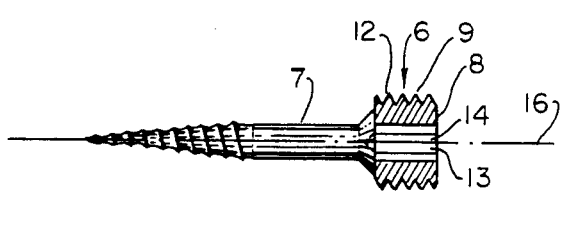
FIG. 2 is a side elevational view of one embodiment of the adjustable connector assembly, shown apart from the wall structure, and illustrating the relationship of the first and second connector members after assembly in a wall structure. The first connector member is shown in cross-section.
Figure 4:
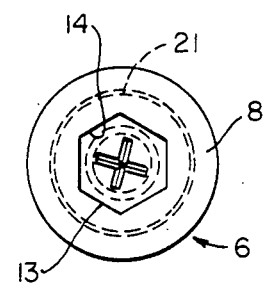
FIG. 4 is an end elevational view of the adjustable connector assembly of FIG. 2.

Accordingly, in terms of greater detail, and referring to the drawings, particularly FIGS. 1, 2 and 3, the adjustable connector assembly of the invention in one of its preferred forms is illustrated in FIG. 2 apart from a wall structure, and shown in FIG. 3 as it would appear after installation and adjustment to secure a frame member such as a door or window frame to a juxtaposed supporting structure such as a stud. It should be understood that while I have chosen to illustrate the adjustable connector assembly of the invention in conjunction with the interconnection of two juxtaposed wood structural members, the adjustable connector assembly may be fabricated for application to other types of materials, such as metal or plastic, without departing from the spirit of the invention.

Referring to FIG. 1, as applied to mount a door frame member 2 in the wall opening of a wall, the wall opening being defined on one side by a vertical structural member 3, the adjustable connector assembly of the invention is designated generally by the numeral 4, while the door supported in the door opening is designated generally by the numeral 5.

The connector assembly is illustrated in FIG. 2 apart from the door frame and supporting structure, but the components of the assembly are illustrated in relation to each other in the positions they will be placed in when adjusted to final position. Thus, the connector assembly of this embodiment as illustrated in FIG. 2 comprises a first connector member designated generally by the numeral 6, and a second connector member designated generally by the numeral 7. The first connector member comprises an elongated generally cylindrical sleeve 8 blunt at both ends and having threads 9 on its exterior periphery 12, and having a central bore 13 defined by an inner peripheral surface 14 symmetrical with respect to the longitudinal axis 16 of the sleeve-like member 6, and having a hexagonal configuration for the reception of a suitable driver tool (not shown) such as a so-called "Allen" wrench.

Because the sleeve 6 is blunt at both ends and threaded for its entire length, it may be threadably turned into an appropriately dimensioned countersunk cylindrical bore 17 drilled into the frame member 2 as shown in FIG. 3. Preferably, a smaller pilot bore 18 is bored coaxially with the bore 17 to allow passage of the second connector member 7 in the form of a wood screw the shank 19 of which passes snugly yet rotatably through the bore 18 to threadably engage the structural member 3, while the tapered head 21 of the screw bottoms out on the tapered section 22 of the bore 17 forming a transition between the bore 17 and the bore 18.

After the screw connector member 7 is inserted through the bore 18 and bottomed out in the bore 17, the tubular sleeve connector member 6 is threadably turned into the larger bore 17 to an abutting relationship with the head 21 of the screw 7, thus locking the frame rigidly in position in relation to the supporting stud 3. It will be seen that the frame cannot move toward the stud because it is prevented from doing so by the tubular connector 6, while it cannot move away from the stud because it is prevented from doing so by the head 21 of the connector member 7. The frame member 2 is now checked to determine if it is plumb. If not, the lock screw connector 6 is backed off the head 21 of the screw connector 7 a turn or two in the proper direction as indicated by the check for plumb, and a tool such as a "Phillips" head screwdriver (not shown) is inserted through the bore of the sleeve connector 6 and engaged with the slot provided for it in the head 21 of the screw connector 7. This screw is now turned until the frame member 2 is plumb, at which time the lock screw connector member 6 is again tightened against the head 21 to rigidly bind the frame member 2 to the stud 3. Alternatively, a combination tool to drive the wood screw and lock sleeve may be inserted to drive the wood screw and lock screw simultaneously to an adjusted position. A suitable cover may now be placed over the bore 17, or the bore may be plugged in a suitable manner so as to conceal the exposed end of the tubular lock screw 6.

It will be apparent from the description above and the illustration in FIG. 3, that this embodiment of the invention is particularly useful for application in the field where the millwork arrives without the connector member 6 embedded in the frame member, or where the frame is assembled in the field, or where remodeling of an existing structure requires that the frame be plumbed.

The embodiment of the invention illustrated in FIG. 5 is quite similar to the embodiment of the invention illustrated in FIG. 2. In this second embodiment, an assembly is illustrated that is more efficiently adapted for factory-installation of the first connector member with only the second connector member being installed in the field. Thus, referring to FIG. 5, it will be seen that the first connector in this embodiment comprises a tubular and cylindrical sleeve-like body 26, symmetrical about a longitudinal axis 27, and being about as long measured along the longitudinal axis as its diameter measured at right angles to the axis. The outer cylindrical periphery 28 is provided with threads 29, and one end portion 31 of the sleeve is tapered inwardly as shown to provide tapered cam surface 32 within the tubular sleeve. The tapered portion of the tubular sleeve is provided with a series of uniformly spaced radial slots 33 defining the tapered cam surfaces 32 and having a depth extending back to the integral jointure of the tapered section with the cylindrical section. The latter is provided with a hexagonal bore 34 symmetrical about the longitudinal axis for reception of a tool, such as an "Allen" wrench, by which the sleeve-like connector may be rotated. I have found that four slots at 90 degree intervals provides four tapered, spaced segments that possess inherent resilience that permits the segments to be elastically deflected outwardly in a manner and for a purpose which will now be explained.

Referring to FIG. 5, there is illustrated the connector assembly comprising the tubular cylindrical sleeve-like first connector 26 having a tapered end portion 31 associated in operative position with the second connector member designated generally by the numeral 36. This second connector may again be a wood screw having a shank portion 37, a threaded section 38 and a head 39 having an appropriate slot or slots for engagement by a complementary screwdriver (not shown).

The tubular connector member is designed to be threadably turned into a cylindrical bore section 41 of predetermined diameter formed in the frame member 42 as illustrated in FIG. 5(A), the cylindrical section adjoining a tapered bore section 43 having a truncated conical configuration, the smaller base of which intercepts a smaller cylindrical bore 44 that extends through the frame member and is dimensioned in its diameter to snugly yet rotatably receive the shank 37 of the screw 36.

It should be noted from FIG. 5(B) that the degree of taper of the tapered bore section 43 is at a lesser angle than the angle of the taper of the tapered end portion 31 of the first connector member. The purpose for this is to provide clearance about the periphery of the tapered end portion 31 for radial expansion of the tapered segments to permit the head 39 of the screw 36 to pass through the first connector member. This enables the first connector member 26 to be installed at the factory to a prescribed and predetermined depth, and permits the second connector member to be installed in the field by extending the screw shank through the first connector until the threads 38 of the second connector engage the stud 46 (FIG. 5(C), whereupon continued clockwise rotation of the second connector will effectively draw the tapered sides of the head 39 of the second connector into camming contact with the tapered segments, causing them to be flexed outwardly until the head 39 snaps through the expanded opening it has provided. The resilient tapered segments then snap back into their original positions as shown in FIG. 5(C), with the head 39 now ahead of the tapered end portion of the first connector, and seated in the tapered truncated conical bore 43 adjoining the cylindrical bore 44. Should adjustment of the frame be necessary, such adjustment may be accomplished by either of the two options previously explained in connection with the embodiment of the invention illustrated in FIG. 3, i.e., the first connector is backed out of the bore slightly to enable withdrawal of the second connector if that is the direction in which the frame must move to achieve plumb, followed by reabutment abutment of the first connector member against the screw head, or the second connector is driven deeper into the stud by a tool (not shown) inserted through the central bore of the first connector, after which the first connector is again turned into the frame until the tapered end portion abuts the head of the now ajusted second connector.

When the screw connector 37 is driven into the stud and the head 39 impinges against the inner tapered camming surfaces 32 of the tapered segments, the force required to be imposed on the cam surfaces to effect elastic expansion of the segments may tend to draw the frame toward the supporting stud more than is desirable. To prevent such unwanted displacement, it may be expedient to temporarily insert a spacer block 47 between the back side of the frame and the juxtaposed face of the stud as shown in broken lines in FIG. 5(C). Now when the screw connector 36 is drawn into the stud and the tapered undersurface of the head impinges on the tapered segments, camming them outwardly, the component of force applied in the direction of the longitudinal axis will be counteracted by the block 47. When it is heard and felt that the head 39 has slipped past the segments, the block may be removed to effect final adjustment of the position of the frame in relation to the stud as previously described.

The embodiment of the invention illustrated in FIGS. 6 through 9, inclusive, also illustrates a first connector member or component of a two-part adjustable connector assembly that includes the second connector member or component illustrated in FIG. 9. With this emnbodiment it is intended that the first connector member be applied in the factory-assembled door or window frame at the time of its fabrication, with application of the second connector member or component applied in the field as will hereinafter be explained.

Referring to FIG. 6, it will be seen that the first connector member of this assembly is designated generally by the numeral 51, and is adapted to be converted into a two-part assembly designated generally by the numeral 52 as illustrated in FIG. 9 by the application in the field of the second connector member designated generally by the numeral 54, which, as shown, comprises a conventional wood screw 56 having a threaded shank portion 57 at one end thereof and a head 58 at its other end. The head 58 is preferably of the flat head type having a conically tapered undersurface 59 as shown.

As seen in FIG. 6, the first connector member of this embodiment of the invention comprises an article of manufacture that may be fabricated from an appropriate metal, or formed from a suitable plastic material that has the characteristic of toughness. The first connector member 51 comprises a central body portion 61, preferably tubular in form, being generally symmetrical about a longitudinal axis 62. The central body portion is preferably tubular but is split longitudinally as at 63 for reasons which will be explained hereinafter. At a first end 64, which may be designated as the inner end, or the end of the connector member that is inserted into the supporting frame member first, the connector member is formed with a plurality of radially outwardly extending flanges 66, conveniently three in number equally spaced circumferentially about the central axis as shown. The flanges 66 are integral with the central body portion and while being tough, they possess a measure of flexibility because they constitute short cantilever beams extending radially outwardly from the central body portion. The advantage of such limited flexibility will be explained hereinafter.

At its opposite end, i.e., its forward or outer end, this being the end that lies closest to the outer exposed surface 67 of the frame member in which the connector is mounted, the tubular body 61 splits into three longitudinally and radially outwardly extending integral spring arms 68, each having at its extreme outer end a reentrant flange 69 that is integral with the spring arm with which it is associated and which doubles back upon the spring arm so as to provide an end surface 71 spaced inwardly a short distance from the extreme outer end 72 of the spring arm. This construction is appropriate, for instance, where the first connector member is fabricated from an appropriate metal such as spring steel. On the other hand, when the first connector member is formed from a tough resilient plastic material, the end surface 71 may be formed by a shoulder formed in the thickened end portion of the spring arm.

Intermediate the ends of the first connector member, i.e., between the inner and outer ends, the tubular body portion 61 is formed with a radially inwardly projecting circular bead 73 that constricts the inner periphery of the tubular body portion to a diameter less then the diameter of the screw with which the first connector member is intended to be assembled. Preferably, this reduced diamter of the tubular body portion closely approximates the diameter of a pilot drill utilized to provide a pilot bore for receiving a wood screw 56 that will be threadably engaged with the stud 74 that constitutes the structural member to which the frame member is attached.

It will thus be seen that the manufacturer of the frame, be it a door frame or a window frame, may accurately and conveniently provide cylindrical bores 76, countersunk at their inner ends to provide a conical bore section 77, which intercepts a smaller cylindrical bore 78 that exits through the opposite face 79 of the frame member. Preferably, the smaller cylindrical bore 78 is dimensioned to snugly embrace the screw 56 that completes the adjustable connector assembly, thus providing a bearing surface for the screw and functioning to provide vertical and lateral support for the frame member.

After the bores 76 are completed, a first connector member, properly sized for cooperation with the bores, is inserted into each bore until the inner end, i.e., the flanges 66 encounter the end of the cylindrical bore and its union with the diminishing diameter conical bore section 77. It should be noted that the radial extension of the flanges 66 are dimensioned to permit such insertion of the first connector member, but the dimensions are not so critical that tight tolerances must be observed. The reason for this is that the flanges 66 possess a measure of flexibility, and if they extend to a diameter greater than the diameter of the bore 76, they may nevertheless be inserted because inward pressure on the connector member will result in flexure of the flanges sufficiently that they will be accommodated in the bore.

After insertion of a first connector member in each of the bores provided in the frame, the frames are packaged for shipment to distributors or retail outlets, where they are purchased by contractors, carpenters and end users for insallation either in new construction or on repair and remodeling projects where new frames are specified. Application of the pre-manufactured frame with the first connector members in place in the bores provided simplifies and reduces the time necessary for the proper installation of the frames.

Thus, all that is required of the carpenter or homeowner is that the frame be placed in the rough opening dimensioned to receive it, and that the inner or hinge edge of the jamb frame be held flush with the interior finish wall. Pilot holes are now drilled into the supporting stud by inserting the proper sized drill through the tubular first connector member installed in each of the bores 76. Next, a screw 56 of appropriate size, is inserted into the first connector member at the top of the frame until the pointed inner end of the screw engages the reduced-diameter bead 73. If the screw is inserted by hand, a small amount of torque applied with the fingers will retain the screw in position for engagement by a power-driven screwdriver.

As the screw threads draw the screw through the constricted section 73, the increased diameter of the screw remote from the point will effect radial expansion of the body portion 61, opening the slit 63, and causing the outer ends of the flanges 66 to bite into the inner periphery of the bore 76. The screw continues through the first connector member and enters the pilot bore previously provided in the stud 74 and continues to be drawn inwardly until the tapered or conical underside 58 of the screw engages the inner mutually-facing surfaces of the reentrant flanges 69, whereupon the arms 68 are caused to elastically flex outwardly, such flexure continuing until the head of the screw at its largest diameter snaps past the end surfaces 71 of the reentrant flanges, whereupon the arms 68 snap radially inwardly so that the outer surface of the flat headed screw is now engaged or abutted against the abutment surfaces 71 of the arms 68.

It will thus be seen that the two-part adjustable connector assembly is now complete and installed, and that adjustment of the frame in relation to the stud may be easily and conveniently effected merely by rotating the screw 56 in the appropriate direction. Since the screw, constituting the second connector member of the assembly, is now "captured" in the first connector member 10 and cannot move axially in relation thereto, it follows that counterclockwise rotation of the screw 56 will impose an outwardly directed force on the first connector member. Since it is firmly held in place by the flanges 66 biting into the bore and by the outer ends of the spring arms 68 also biting into the inner periphery of the bore 76, the force is transferred to the frame member through the first connector member and the frame member will move away from the supporting stud. On the other hand, if to secure plumb it is necessary for the frame to move toward the stud, this is easily accomplished by rotating the screw 56 clockwise, thus causing the conically tapered underside 58 of the screw head to impinge on the complementarily tapered inner surfaces of the spring arms 68, thus imposing an inwardly directed component of force on the frame through the first connector, and displacing the frame toward the stud. After the frame is adjusted to final and permanent position, the bores 76 may be filled with an appropriate filler material (not shown) that matches the frame material, or the bores may be capped with an appropriate conventional cap (not shown) designed to snap into the opening and provide an aesthetic finish for the installation.

Having thus described the invention, what is believed to be novel and sought to be protected by letters patent of the United States is as follows.

I claim:

1. An adjustable connector assembly for connecting and selectively adjusting the relative positions of first and second juxtaposed members secured to each other by the adjustable connector assembly to enable adjustment of the first member to a condition of plumb despite the absence of this quality in said second member, comprising:

(a) a first connector member adapted to be embedded in said first juxtaposed member;

(b) a second connector member including a first shank portion rotatably journaled in said first juxtaposed member and a second shank portion threadably engaging said second juxtaposed member, said second connector member being restrained against axial displacement in relation to said first juxtaposed member by said first connector member, whereby rotation of said second connector member in one direction in relation to said first connector member effects relative movement of said first juxtaposed member away from said second juxtaposed member while rotation of the second connector member in the opposite direction in relation to the first connector member effects relative movement of the first juxtaposed member toward the second juxtaposed member;

(c) said first connector member including a tubular sleeve symmetrical about a longitudinal axis and having inner and outer peripheries, said outer periphery having screw threads adapted to engage said first juxtaposed member; and (d) said second connector member comprising an elongated shank having threads on one end portion of said second connector member being adapted to threadably engage said second juxtaposed member and said head end portion of the second connector member being adapted to be rotatably embedded in said first juxtaposed, member and rotatable in relation to said first connector member, whereby said second connector member is captured against axial displacement in relation to said first connector member and said first juxtaposed member;

(e) wherein said first juxtaposed member is provided with a main cylindrical bore countersunk at its inner end to provide a conically tapered bore section intercepting a smaller cylindrical bore section, said first connector member is adapted to threadably engage said main cylindrical bore, and said second connector member includes a head having a flat upper surface and a conically tapered underside, said flat surface of the head rotatably engaging said first connector member to preclude axial displacement of said second connector member in one direction and being restrained against axial displacement in the opposite direction by said first juxtaposed member.

2. The adjustable connector assembly according to claim 1, wherein said first and second connector members are coaxially arranged with respect to each other, and rotation of said second connector member in relation to said first connector member after installation in said first juxtaposed member effects displacement of said first juxtaposed member in relation to said second juxtaposed member.

3. The adjustable connector assembly according to claim 1, wherein said first connector member includes a tubular cylindrical portion having threads on its outer periphery and an integral conically tapered end portion defined by a multiplicity of circularly arranged spaced segments.

4. The adjustable connector assembly according to claim 1, wherein said first connector member includes a tubular cylindrical portion having threads on its outer periphery, and means on its inner periphery adapted for engagement by a tool to effect rotation of said first connector member.

5. The adjustable connector assembly according to claim 1, wherein said first connector member comprises a generally tubular elongated main body portion having opposite ends, at least one radially extending flange integral with one end of said main body portion, a plurality of longitudinally and radially extending spring arms integral with the other end of said main body portion and presenting free end portions radially spaced nd lying in a common plane, and cam surface means on the free end of each said spring arm adapted to be engaged by the tapered underside of the head of said second connector member when applied to elastically radially displace said spring arms to accommodate passage of the second connector head therebetween.

6. The adjustable connector assembly according to claim 5, wherein said free end portions of said spring arms include abutment means associated with said cam surface means whereby the head of said second connector means is captured by said abutment means when said head slips past said cam surface means.

7. The adjustable connector assembly according to claim 6, wherein said main body portion is provided with a longitudinally extending slit enabling expansion of said main body portion.

8. The adjustable connector assembly according to claim 7, wherein said main body portion is provided with a radially inwardly extending circular bead adjacent said first end, whereby insertion of the shank of said second connector member through said first connector member engages said bead and expands said main body portion and the associated radially extending flange to cause said flange to impinge on the inner periphery of said main bore in said first juxtaposed member.

* * * * *